Patented Mar. 6, 1934

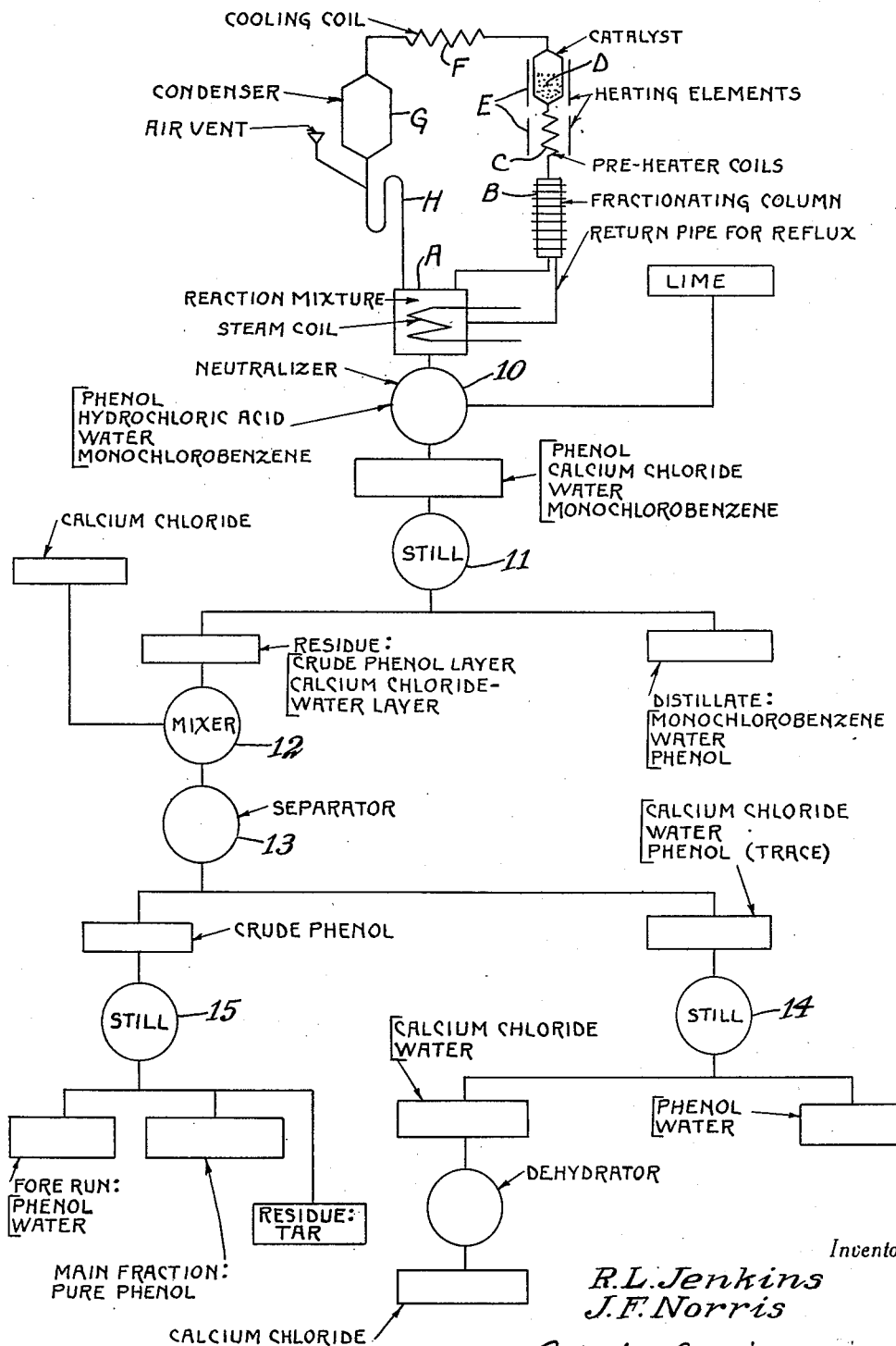

1,950,359

UNITED STATES PATENT OFFICE 1,950,359

METHOD OF MAKING CARBOLIC ACID

Russell L. Jenkins, Anniston, Ala., and James F. Norris, Cambridge, Mass., assignors to Swann Research, Inc., a corporation of Alabama Application October 22, 1928, Serial No. 314,318

6 Claims. (Cl. 260—154)

Our invention relates to a method of making carbolic acid, or phenol ($C_6H_5OH$) which embodies the interaction, in the vapor phase, of steam with a monohalogen derivative of benzol in the presence of a suitable catalyst, and has for its object the provision of a method of the character designated which shall be simple of operation and which shall effect a relatively high yield of carbolic acid per unit of time of operation.

A further object of our invention is to provide a method for producing carbolic acid by the interaction, in the vapor phase, of steam with a monohalogen derivative of benzol in the presence of a catalyst and wherein water and the monohalogen derivative of benzol are evaporated, passed over a catalyst, condensed and returned for evaporation in a repeating cycle until the major portion of the available monohalogen derivative of benzol has been converted into carbolic acid and other products of the interaction.

A further object of our invention is to provide a method for producing carbolic acid by the repeated evaporation of water and a monohalogen derivative of benzol, circulation of the mixed vapors over a catalyst, condensation and return thereof in a repeated cycle, and embodying means whereby carbolic acid formed at each pass over the catalyst is separated from the vapor cycle.

A still further object of our invention is to provide a method of producing carbolic acid embodying the vaporization of water and, a monohalogen derivative of benzol, passing the vapors over a catalyst, condensation and return of the vapors for re-evaporation, entailing the formation of a mixture of carbolic acid, hydrochloric acid and a residue, and which shall include an improved method of separation of the carbolic acid from the reaction mixture.

A still further object of our invention is to provide a method for the production of carbolic acid and calcium chloride in one operation and which shall embody the vaporization of water and a monohalogen derivative of benzol, passing the vapor through a catalyst bed, condensation and return thereof for re-evaporation in a repeated cycle, and which shall include improved means for separating the carbolic acid from the calcium chloride.

The production of carbolic acid by the repassing of a monohalogen derivative of benzol, in the vapor phase, such as monochlorobenzene with steam over a catalyst has already been proposed, but the methods with which we are familiar involve either a difficult and uneconomical separation of the phenol and hydrochloric acid formed by the reaction from a considerable excess of monochlorobenzene and water, or else involve the retention of the phenol and hydrochloric acid in a boiler by means of a caustic soda, which is expensive, so that neither of these methods is commercially feasible. By means of our invention it is possible to separate the phenol, or carbolic acid, and hydrochloric acid easily and rapidly and to return the unreacted monochlorobenzene to the system without the use of an expensive base to react with the hydrochloric acid and phenol and the process once started proceeds smoothly and continuously until the reaction has gone to from 90% to 100% of completion.

Furthermore, by our improved method, the reaction products are separated by a means wherein it is possible to recover from the mixture of phenol, water and hydrochloric acid, produced by the reaction, more than 90% of the phenol contained therein as commercially salable phenol and more than 90% of the hydrochloric acid contained therein as calcium chloride.

Briefly, our invention comprises the provision of a reaction mixture consisting of chlorobenzene and water which is placed in a boiler or other suitable vessel and is vaporized, passed through a catalyst bed where phenol and hydrochloric acid, are formed. The vapors are then condensed and returned to the boiler for re-evaporation of the unreacted chlorobenzene and water. An important feature of this part of our process is the provision of a fractionating column inserted between the boiler and the catalyst bed which operates to return the products of the reaction to the boiler with the reflux, thus obviating the recirculation of the phenol through the cycle, and permitting the vaporized chlorobenzene and water to pass on to and through the catalyst.

During this part of the process, hydrochloric acid is formed along with the carbolic acid and we prefer to neutralize the free hydrochloric acid which is formed, with lime, forming calcium chloride, adding just sufficient lime to the charge before introduction into the boiler to accomplish this neutralization.

When the reaction has proceeded to from 90% to 100% of completion, the vaporization and circulation is stopped and separation of the products of reaction is made. This part of the process embodies a series of steps, beginning with distilling off the unreacted chlorobenzene and a part of the water, which is returned to the boiler for recirculation, as described in the first part of the process. The residue, when necessary, is then treated with sufficient calcium chloride to bring the calcium chloride in the aqueous layer of the residue up to 39 to 40% by weight of the aqueous layer, at which concentration less than 0.3% by volume of phenol is retained in solution in the aqueous layer at ordinary temperatures.

Where there is not an excess of water in the original mixture, the aqueous layer will already contain the preferred 39 to 40% by weight of calcium chloride thus making it unnecessary to add more calcium chloride. The attainment of this percentage is an important feature of the process because, where lower concentrations of calcium chloride are employed, so much phenol is retained in the aqueous layer that it is impossible to obtain as high yields in the commercially salable phenol as where concentrations around 39 to 40% or employed. Where the concentrations are above 39 to 40%, the solution is so viscous that efficient separation of phenol and the aqueous layer is difficult.

The calcium chloride solution and phenol layers are then separated, whereupon the calcium chloride layer will contain a small amount of phenol which is distilled off, leaving the calcium chloride and water which may be concentrated to produce commercial calcium chloride. The crude phenol obtained by the separation above described is then distilled to obtain pure phenol and separate it from the residue.

In order that our invention may be more clearly understood, reference will now be had to the accompanying diagrammatic drawing, setting forth in detail the steps of the process.

A charge of substantially the following proportions:

| | Parts |
|---|---|
| Water | 1155 |
| Monochlorobenzene | 903 |
| Lime | 300 | is placed in a boiler A provided with a suitable steam coil for vaporizing the charge. In communication with the boiler is a fractionating column B and above this is preheating coil C where the vapors are heated to around 550° C. This is followed by a catalyst bed D, which is also heated to around 550° C., suitable heating elements E being provided for both the catalyst bed and the preheater coils. While any suitable catalyst may be employed, we prefer a porous silica catalyst of a high order of catalytic activity. The vapors passing such a catalyst, when heated to a temperature around 550° C. are hydrolized to form phenol and hydrochloric acid.

After passing through the catalyst bed, the vapors flow through cooling coils F to a suitable condenser G and thence through a trap H back to the boiler A, a suitable air vent being interposed between the condenser and the trap. During the repeated vaporization and circulation of the vapors, the fractionating column B operates to return vaporized phenol to the boiler A and to permit the desired proportion of unreacted products to pass to the catalyst, while the lime in the boiler reacts with the hydrochloric acid formed to produce calcium chloride.

When the process of vaporization and circulation has continued until substantially all of the chlorobenzene has reacted with the steam, the resultant mixture of phenol, chlorobenzene, water and hydrochloric acid, if the latter is not already neutralized by the addition of lime to the boiler, is placed in a neutralizer 10 where sufficient lime is added to react with the hydrochloric acid, giving a mixture of chlorobenzene, water, calcium chloride and phenol. This mixture is then passed to a still 11 where the chlorobenzene remaining in the mixture is distilled off carrying with it water and a small amount of phenol which are returned to the boiler for reuse in the cycle. The residue in the still, comprising a crude phenol layer and a calcium chloride-water layer, if there is present an excess of water, is passed to a mixer 12 where sufficient anhydrous calcium chloride is added and dissolved in the mixture, to bring the concentration of calcium chloride aqueous layer up to 39 to 40% by weight of the aqueous layer.

The phenol layer in the residue is then separated by a gravity separator 13 from the heavier calcium chloride layer. The calcium chloride layer is then subjected to distillation in a still 14 which is not equipped with a fractionating column. In this step it is only necessary to distil off around 4% of the liquid volume in order to remove all of the phenol, provided no phenol is present as an emulsion, in which case, a slightly greater percent of the liquid volume must be distilled to remove all the phenol.

The phenol layer obtained from the separator 13 is next distilled in a still 15 which is provided with a fractionating column and the following fractions obtained: fraction 1, boiling at 99° C. to 177.5° C., and fraction 2, boiling at from 177.5° C. to 179° C., when pure crystalline phenol is obtained, leaving a residue in the still of a small portion of tar and by-products. The phenol in fraction 2, which crystallizes on cooling, amounts to more than 90% of the total phenol contained in the original mixture.

While we have illustrated and described our invention as producing phenol, or carbolic acid, by the interaction of steam and chlorobenzene, other halogen derivatives of benzol, such as bromobenzol, may be employed and it is to be understood that we are not limited to the chlorobenzene so particularly described.

What we claim is:

1. In a process of producing phenol by the interaction of steam and monochlorobenzene and obtaining a mixture of hydrochloric acid, phenol, monochlorobenzene and water, the steps which consist in neutralizing the hydrochloric acid with lime, distilling the mixture until substantially all of the monochlorobenzene is removed, adding calcium chloride to produce a concentration of calcium chloride equal to approximately 40% by weight of the aqueous layer, separating the aqueous calcium chloride layer from the phenol layer, and distilling the phenol layer to produce pure crystalline phenol.

2. In a process of producing phenol which includes as an intermediate step the obtaining of a mixture of hydrochloric acid phenol and water, the steps which consist in neutralizing the hydrochloric acid with lime, adding calcium chloride to produce a concentration of calcium chloride equal to approximately 40% of the combined weight of the calcium chloride and water, separating the aqueous calcium chloride layer from the phenol layer, and distilling the phenol layer to produce pure crystalline phenol.

3. In a process for making phenol by the interaction of steam and chlor-benzene in the vapor phase in the presence of a catalyst effective to bring about said interaction, passing mixed vapors of steam and chlor-benzene over said catalyst and condensing and revaporizing the mixture repeatedly until there has occurred substantially a complete reaction forming phenol and hydrochloric acid, and removing the phenol vaporized in each cycle from the mixed vapors by fractional condensation before repassing the vapors over the catalyst.

4. The process of making phenol which comprises repeatedly vaporizing a mixture of water and chlor-benzene, repeatedly passing the mixed vapors over a silica catalyst bed, repeatedly condensing the vapors and returning the condensate for revaporization until substantially a complete reaction has occurred forming phenol and hydrochloric acid, and removing the phenol vaporized in each cycle from the vapors by fractional condensation before reaching the catalyst.

5. The process of making phenol which comprises repeatedly vaporizing a mixture of water and chlor-benzene, repeatedly passing the mixed vapors over a catalyst bed effective to bring about a reaction between the vapors and produce phenol and repeatedly condensing the vapors until substantially a complete reaction has occurred forming phenol and hydrochloric acid, revaporizing the condensate, removing the phenol vaporized in each cycle from the vapors by fractional condensation before the vapors reach the catalyst, and removing the hydrochloric acid from the condensate by neutralizing the same with lime before revaporization in each cycle.

6. The process of making phenol which comprises vaporizing a mixture of water and chlor-benzene, repeatedly passing the mixed vapors over a catalyst bed effective to bring about a reaction between the mixed vapors and produce phenol, and repeatedly condensing and revaporizing the mixture until substantially a complete reaction has occurred forming phenol and hydrochloric acid, removing the phenol formed in each cycle from the vapors by fractional condensation before the vapors reach the catalyst, and removing the hydrochloric acid from the mixture as it is formed and condensed in each cycle before revaporization by neutralizing the same with lime, the lime being limited in quantity to an amount sufficient to neutralize the hydrochloric acid.

RUSSELL L. JENKINS.
JAMES F. NORRIS.